(12) United States Patent
Dartez

(10) Patent No.: US 8,016,273 B1
(45) Date of Patent: Sep. 13, 2011

(54) AERATOR

(76) Inventor: James R. Dartez, New Orleans, LA (US)

(*) Notice: Subject to any disclaimer, the term of this patent is extended or adjusted under 35 U.S.C. 154(b) by 1063 days.

(21) Appl. No.: 11/893,201

(22) Filed: Aug. 15, 2007

(51) Int. Cl.
*B01F 3/04* (2006.01)

(52) U.S. Cl. ............ 261/120; 261/122.1; 261/123; 261/124

(58) Field of Classification Search .......... 261/23.1, 261/120, 122.1, 122.2, 123, 124, DIG. 70, 261/21
See application file for complete search history.

(56) References Cited

U.S. PATENT DOCUMENTS

| | | | |
|---|---|---|---|
| 3,365,178 A | 1/1968 | Bood | |
| 3,396,950 A * | 8/1968 | Wood | 261/122.1 |
| 3,643,403 A | 2/1972 | Speece | |
| 3,970,731 A * | 7/1976 | Oksman | 261/122.1 |
| 4,514,343 A | 4/1985 | Cramer et al. | |
| 4,557,879 A * | 12/1985 | Weber | 261/122.1 |
| 5,223,130 A * | 6/1993 | Valfrido | 210/170.02 |
| 5,441,640 A * | 8/1995 | Baxter | 210/607 |
| 6,076,812 A | 6/2000 | Lisi | |
| 6,773,593 B2 * | 8/2004 | Young | 210/605 |
| 7,074,328 B2 | 7/2006 | O'Hara | |
| 7,622,040 B2 * | 11/2009 | Mitchell et al. | 210/242.2 |
| 7,874,548 B1 * | 1/2011 | McGuffin | 261/120 |
| 2003/0127754 A1 | 7/2003 | Ruzicka et al. | |
| 2009/0188672 A1 * | 7/2009 | Norris et al. | 166/369 |

* cited by examiner

*Primary Examiner* — Charles Bushey
(74) *Attorney, Agent, or Firm* — Roy Kiesel Ford Doody & Thurmon

(57) ABSTRACT

An improved aerator for creating gas-enriched water in aquaculture bodies of water, as well as other shallow ponds and lagoons, comprising a dual diffuser system providing for a large bubble water-mixing phase coupled with a small bubble water-aeration phase.

25 Claims, 4 Drawing Sheets

US 8,016,273 B1

AERATOR

BACKGROUND OF THE INVENTION

1. Field of the Invention

This invention relates to aeration systems in general and to an improved aerator to enhance water-oxygen concentrations in aquaculture water bodies, as well as other shallow ponds and lagoons, in particular.

2. Prior Art

Aerators utilized to oxygenate water bodies and maintain aquatic and plant life in aquaculture-farming operations are well known in the prior art, however there remains a need for their improvement. Known aerating devices include mechanical aerators, aspirator-type aerators, diffuser-type aerators, rotor aerators, etc. A common problem with many prior art aerators is that they involve high operating costs, as they are often based on electric motor driven rotators/propellers that consume vast amounts of energy. Another common problem is that many prior art aerators are not effective in mixing or destratifying the water, leading to stagnation and layering of the water body, which in turn causes waste build up, as well as an oxygen-deficient water level commonly located on the bottom. Finally, due to the shallow nature of ponds and lagoons, many prior art aerators do not provide for maximum oxygenation solubility, resulting in inadequate levels of dissolved oxygen in the water body, in turn leading to fish kills. Therefore, an improved aerator meeting the following objectives would be highly desirable in the industry.

OBJECTS AND SUMMARY OF THE INVENTION

It is an object of the invention to provide an improved aerator that overcomes the disadvantages of prior art aerators.

It is an object of the invention to provide an improved aerator that reduces operating cost concerns.

It is an object of the invention to provide an improved aerator that utilizes a dual diffuser system designed to provide both an efficient mixing, as well as an effective aeration of the water body.

It is another object of the invention to provide an improved aerator that achieves higher oxygenation efficiencies to better support aquatic life in shallow water ponds and lagoons used for aquaculture-farming operations.

Other objects and advantages of this invention shall become apparent from the ensuing description of the invention. Accordingly, an improved aerator is disclosed. The aerator comprises a housing configured to be positioned in the water body; the housing further having a water inlet section; a water outlet section; a baffle plate of curved or straight configuration; a plurality of coarse-porous diffusers and a plurality of fine-porous diffusers situated between the water inlet section and the water outlet section; the housing further comprising a first source of air in fluid communication with the coarse-porous diffusers and adjustable to deliver air to the coarse-porous diffusers at a first pressure P1 and first volume V1; a second source of air in fluid communication with the fine-porous diffusers and adjustable to deliver air to the fine-porous diffusers at a second pressure P2 and second volume V2; the housing further comprising a flotation support frame and anchoring members.

BRIEF DESCRIPTIONS OF THE DRAWINGS

DESCRIPTION OF THE PREFERRED EMBODIMENTS OF THIS INVENTION

An improved aerator for the oxygenation of aquaculture water bodies such as catfish farm ponds, as well as other types of ponds and lagoons, is disclosed. Without attempting to limit the scope of the invention, the preferred embodiments of the invention are described with reference to FIGS. 1-4.

Figure 1:
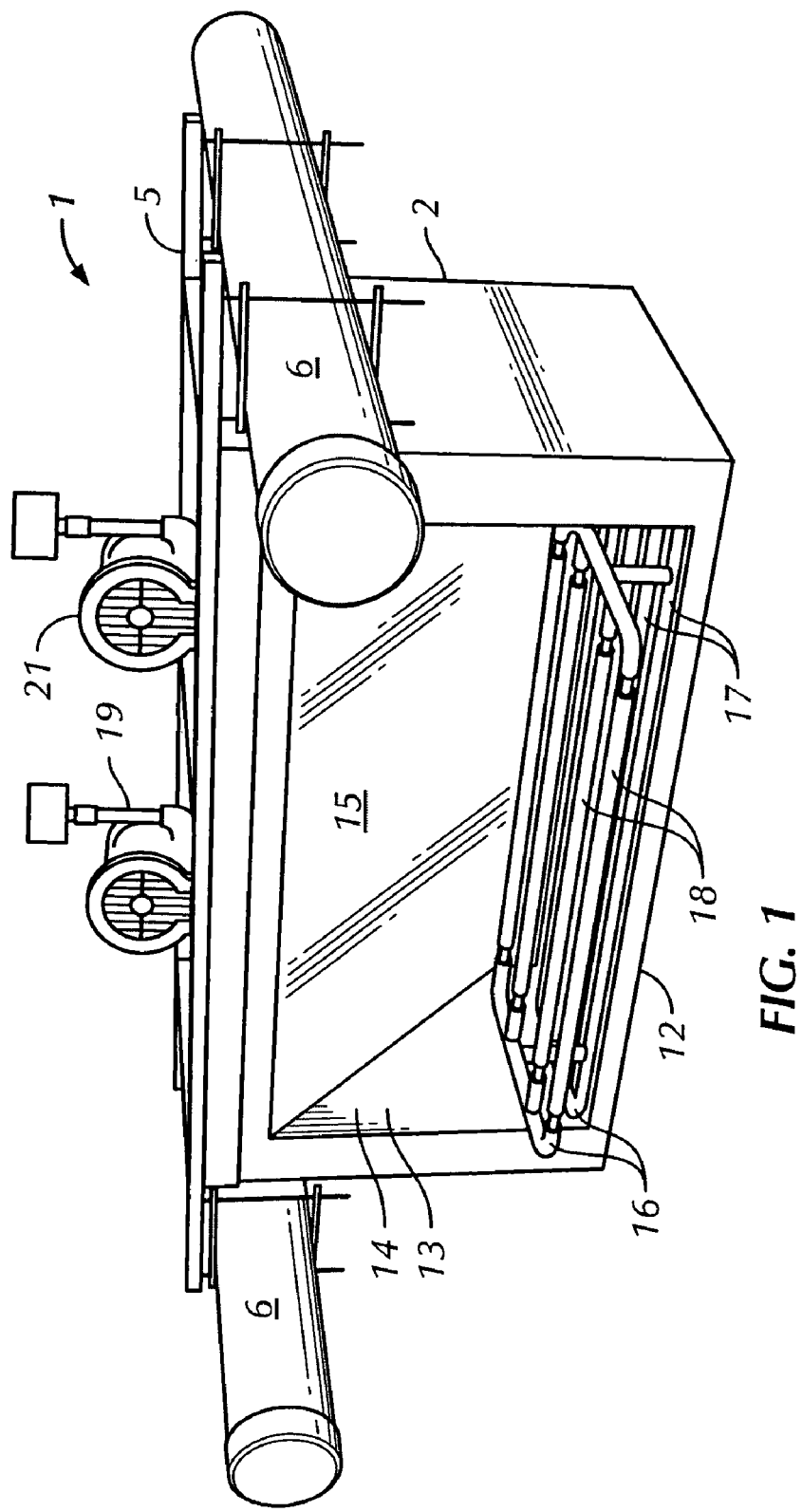
FIG. 1 is a perspective view of a preferred embodiment of the improved aerator of the present invention.
Figure 4:
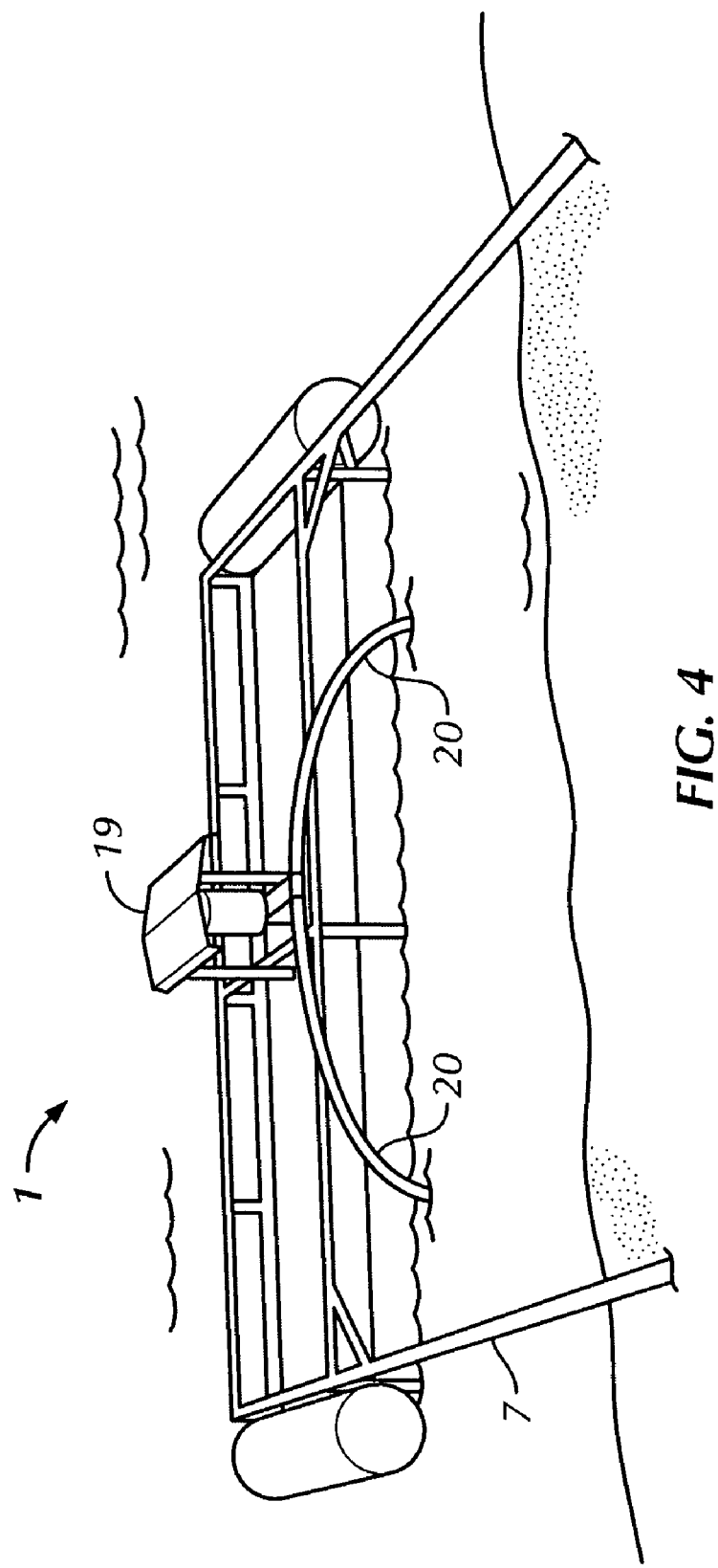
FIG. 4 is a perspective view of a preferred embodiment of the improved aerator anchored to the shore during operation.

Referring now to FIG. 1, a preferred embodiment of the aerator 1 of the present invention is illustrated. Aerator 1 comprises a generally rectangular housing 2 configured to be floatably positioned in a body of water. In a preferred embodiment, housing 2 is mounted to an internal flotation support frame 5 configured to keep housing 2 suspended in a level and stable manner, in a desired position and depth, with respect to the water level of the water body during operation of aerator 1. Frame 5 may further be provided with a plurality of floats 6 for additional stability. Frame 5 may also further be provided with lugs configured to engage cables such that aerator can be raised or lowered into the desired position in the body of water. In a further preferred embodiment, and as depicted in FIG. 4, housing 2 is provided with anchoring members 7, such as cables or legs used in conjunction with stakes or spikes to be embedded into the soil, designed and configured to allow the housing be anchored to a body of land adjacent to the water body for greater stability during operation.

Figure 2:
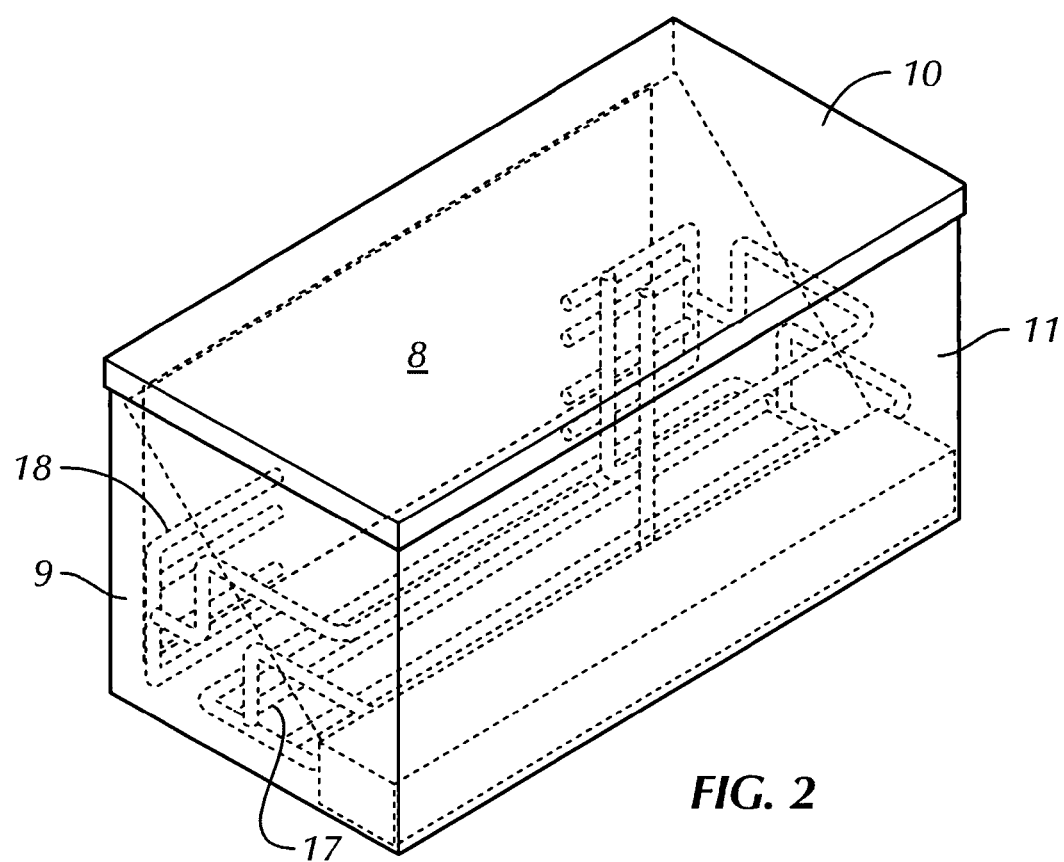
FIG. 2 is a perspective view of a preferred embodiment of the aerator housing depicting a preferred arrangement of the coarse-porous and fine-porous diffusers
Figure 3A:
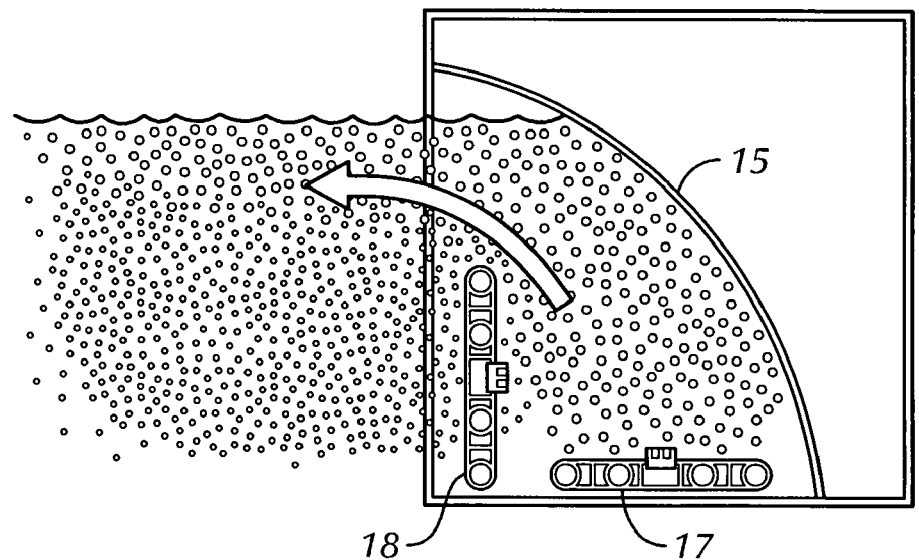
FIGS. 3A and 3B are schematic diagrams of the improved aerator, with the arrows depicting the direction of the water flow during operation.
Figure 3B:
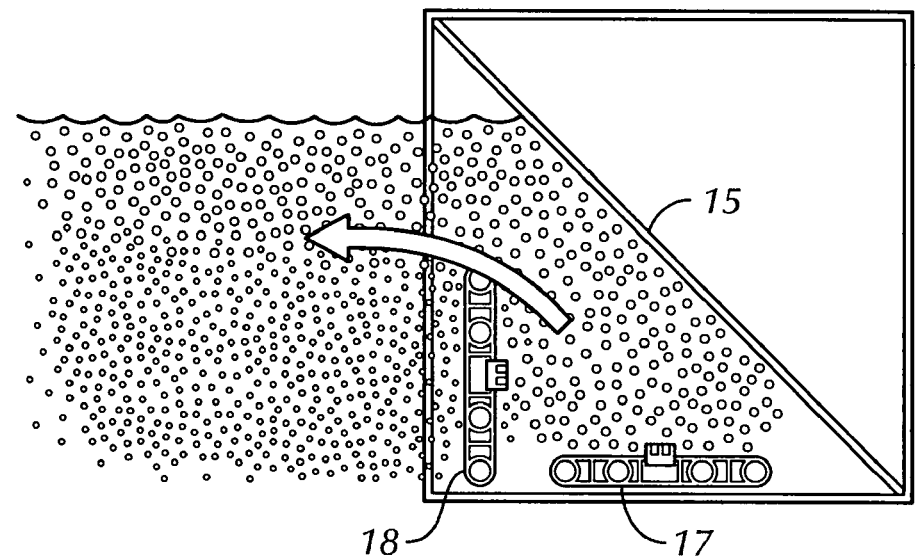

In a preferred embodiment, and as illustrated in FIGS. 1 and 2, housing 2 includes a top plate 8, two end plates 9,10, and a back plate 11, housing 2 being open-ended at its bottom to form a water inlet section 12, housing 2 further being open in the front to form a water outlet section 13. Housing 2 is further generally hollow, defining a water-confining passageway 14 between inlet section 12 and outlet section 13. In a further preferred embodiment, housing 2 is provided with a baffle plate 15, as depicted in FIGS. 3A and 3B, and positioned within housing 2 to confine and direct the flow of water from inlet section 12 to outlet section 13. Baffle plate 15 is preferably straight and situated at a forty-five degree angle within housing 2. However it is contemplated that baffle plate 15 can also have other configurations, for e.g. curved, and can be positioned within housing 2 at other suitable angles, as long as baffle plate 15 functions to effectively confine and direct water flow.

As illustrated in FIGS. 1 and 2, housing 2 further preferably comprises an improved diffuser system 16 positioned in passageway 14 to generate bubbles. In diffuser systems in general, the size of the bubbles being generated depends upon a variety of factors, including the diameter size of the diffuser, the pore size of the diffuser, the type of diffuser material, the volume of the air being supplied to the diffuser, and the pressure of the air exiting the pores of the diffuser. Improved diffuser system 16 of the present invention utilizes a dual diffuser configuration to generate bubbles of both a large and small size to achieve maximum oxygenation efficiencies, as will be discussed further below.

In a preferred embodiment, and as depicted by FIGS. 1, 2, 3A and 3B, dual diffuser system 16 of aerator 1 comprises at least one coarse-porous diffuser 17 and at least one fine-porous diffuser 18. In a more preferred embodiment, dual diffuser system 16 comprises a first set of diffusers 17, including a plurality of coarse-porous diffusers 17, and a second set of diffusers 18, including a plurality of fine-porous diffusers 18. Coarse-porous diffusers 17 are preferably disposed within housing 1 on a co-planar and generally horizontal axis, proximate to water inlet section 12. In a preferred embodiment, fine-porous diffusers 18 may be disposed above, below, or on the same plane as, coarse-porous diffusers 17. In a further preferred embodiment, fine-porous diffusers 18 are preferably co-planar to each other, and disposed on a generally horizontal axis, proximate to water outlet section 13 and further extend outside of housing 2, forward of coarse-porous diffusers 17. See FIG. 1. In another alternative preferred embodiment, fine-porous diffusers 18 are disposed above coarse-porous diffusers 17, on a multi-planar, generally vertical axis, proximate to water outlet section 13. See FIG. 2. In short, coarse and fine-porous diffusers 17 and 18, can be disposed and oriented within housing 2 in any suitable manner that allows them to function effectively, such that aerator 1 provides for both a large bubble water-mixing phase and a small bubble water-aeration phase, as further discussed below.

Diffusers 17 and 18 are preferably of a tubular configuration comprising pores extending uniformly through same. In a preferred embodiment, each coarse-porous diffuser 17 has a diameter between about 3.8 cm to about 6.5 cm and a coarse pore size between about 1.5 cm to about 2.5 cm, while each fine-porous diffuser 18 has a diameter of about 5 cm and a fine pore size between about 0.5 mm to about 1 mm. In a further preferred embodiment, coarse-porous diffusers 17 will be made from materials such as PVC, aluminum, and stainless steel, while fine-porous diffusers 18 will be made from materials such as PVC, HDPE or rubber.

In a further preferred embodiment of aerator 1, and as depicted in FIG. 4, an external source of forced air 19, such as a blower or pump, is mounted to housing 2. Source 19 is in fluid communication with dual diffuser system 16 via a plurality of airtight conduits 20 running from source 19 to diffuser system 16. In a preferred embodiment, source 19 can deliver air to the first set of coarse-porous diffusers 17 at a volume and pressure that is equivalent to that of the air being delivered to the second set of fine-porous diffusers 18. For example, assuming an 8 foot aerator unit 1, in one mode of operation, source 19 could deliver air to both sets of diffusers, 17 and 18, at 1.5 HP. In a further preferred embodiment, source 19 is adjustable such that the volume and pressure of the air being delivered to first set of coarse-porous diffusers 17 is different from that being delivered to second set of fine-porous diffusers 18. This can be accomplished, for example, by utilizing a valve system that is adjustable either manually, or via an appropriate automatic system including suitable sensors. Source 19 may further be electrically connected to an onshore power supply via a water-tight electric cable, alternatively, source 19 may comprise its own internal power source, such as a battery.

In an alternative preferred embodiment, and as illustrated in FIG. 1, aerator 1 is provided with two separate forced air sources, a first source 19 and a second source 21. In this embodiment, first source 19 is in fluid communication with first set of coarse-porous diffusers 17 and configured to introduce air through same at a desired volume and pressure, while second source 21 is in fluid communication with second set of fine-porous diffusers 18 and configured to introduce air or gas through same at a different desired volume and pressure.

In operation, aerator 1 is first installed in a desired area of a water body by extending aerator 1 into the water at a desired depth beneath the water's surface, such that inlet section 12 of housing 2 is submerged. Aerator 1 is then anchored, via anchoring members 7, to a body of land adjacent to the water body for greater stability during operation, as discussed above. See FIG. 4. After aerator 1 has been anchored, source 19, and source 21, if provided, is then activated, upon which air is introduced through both coarse-porous diffusers 17 and through fine-porous diffusers 18 of dual diffuser system 16. In a preferred mode of operation, air is delivered to coarse-porous diffusers such that the air, when exiting through the coarse pores of diffusers 17, forms large bubbles. Air is also delivered to fine-porous diffusers 18 to generate fine bubbles.

Upon operation of aerator 1, and as depicted by FIGS. 3A and 3B, the large bubbles generated by coarse-porous diffusers 17 establish an intake flow gradient, inducing a volume of oxygen-deficient water from the deeper parts of the water body to be raised into water inlet section 12 and through passageway 14. As the water flows through passageway 14, the large bubbles cause the liquid to be continuously inverted from top to bottom on a horizontal axis. In this manner, gravitational settling is prevented and an effective and continuous destratification is achieved. Furthermore, as these large bubbles rise toward the surface of the water body, they form a surface blanket, effectively trapping the smaller oxygen bubbles, generated by fine-porous diffusers 18, underneath them. In this manner, the smaller oxygen bubbles are trapped beneath the larger bubbles, and their natural inclination to flow upwards is restricted. Instead, these smaller bubbles are now forced to flow in a horizontal manner beneath the larger bubbles, this in turn increasing the retention time of the smaller bubbles in the water body for a better dissolution. These small bubbles entrain and aerate the water as it exits housing 2 via outlet section 13 and flows back into surrounding water body to enhance the oxygen content of same. In this fashion, dual diffuser system 16 of improved aerator 1 provides for both a large bubble water-mixing phase and a small bubble water-aeration phase, this in turn providing for higher oxygenation efficiencies. Furthermore, cost efficiency is also achieved, as the operation of improved aerator 1 is not dependent on high-energy consumption rotators/propellers.

In a more preferred embodiment, a plurality of aerators 1 can be installed at the beginning of operation and utilized simultaneously to fully aerate and destratify the body of water.

It is to be noted that although aerator 1 of the present invention has been discussed in the context of aquaculture operations, aerator 1 may also have application in other situations, such as wastewater treatment where aerator 1 can be used to aerate effluent or sewage lagoons to enhance biodegradation of same or in municipal leachate lagoons where dissolved oxygen levels must be maintained for biodegradation purposes.

What I claim is:

1. An improved aerator for the oxygenation of a water body comprising:
    a. a housing configured to be positioned in the water body, the housing further having a water inlet section and a water outlet section;
    b. the housing further comprising a coarse-porous diffuser and a fine-porous diffuser situated between the water inlet section and the water outlet section, wherein the coarse-porous diffuser is disposed proximate to the water inlet section and wherein the fine-porous diffuser is disposed proximate to the water outlet section;
    c. the housing further comprising a source of air in fluid communication with the diffusers.

2. The aerator according to claim 1, wherein the coarse-porous diffuser has a pore size in the range of about 1.5 cm to about 2.5 cm.

3. The aerator according to claim 1, wherein the fine-porous diffuser has a pore size in the range of about 0.5 mm to about 1 mm.

4. The aerator according to claim 1, wherein the housing is configured to be floatable in the body of water.

5. The aerator according to claim 4, wherein the housing further comprises a flotation support frame.

6. The aerator according to claim 1, wherein the housing further comprises a baffle plate to confine and direct the flow of water from the water inlet section to the water outlet section.

7. The aerator according to claim 6, wherein the baffle plate has a curved configuration.

8. The aerator according to claim 6, wherein the baffle plate has a straight configuration and is situated at a forty five degree angle within housing.

9. The aerator according to claim 1, wherein the air source can be adjusted to deliver air to the coarse-porous diffuser at a first pressure P1, and to the fine-porous diffuser at a second pressure P2.

10. The aerator according to claim 1, wherein the air source can be adjusted to deliver air to the coarse-porous diffuser at a first volume V1, and to the fine-porous diffuser at a second volume V2.

11. The aerator according to claim 1, wherein the air source is a blower.

12. The aerator according to claim 1, wherein the housing further comprises a first air source and a second air source, wherein the first air source is in fluid communication with the coarse-porous diffuser, and wherein the second air source is in fluid communication with the fine-porous diffuser.

13. The aerator according to claim 1, wherein the housing further comprises anchoring members.

14. An improved aerator for the oxygenation of a water body comprising:
   a. a housing configured to be positioned in the water body, the housing further having a water inlet section and a water outlet section;
   b. the housing further comprising a plurality of coarse-porous diffusers and a plurality of fine-porous diffusers situated between the water inlet section and the water outlet section, wherein the coarse-porous diffusers are disposed within the housing on a co-planar and generally horizontal axis, proximate to the water inlet section, and wherein the fine-porous diffusers are disposed forward of the coarse-porous diffusers on a co-planar, generally horizontal axis, proximate to the water outlet section, wherein the fine-porous diffusers further extend outside of the housing;
   c. the housing further comprising a first source of air in fluid communication with the coarse-porous diffusers, the housing further comprising a second source of air in fluid communication with the fine-porous diffusers.

15. The aerator according to claim 14, wherein the coarse-porous diffusers have a pore size in the range of about 1.5 cm to about 2.5 cm.

16. The aerator according to claim 14, wherein the fine-porous diffusers have a pore size in the range of about 0.5 mm to about 1 mm.

17. The aerator according to claim 14, wherein the first source of air can be adjusted to deliver air to the coarse-porous diffusers at a first pressure P1, wherein the second source of air can be adjusted to deliver air to the fine-porous diffusers at a second pressure P2.

18. The aerator according to claim 14, wherein the first source of air can be adjusted to deliver air to the coarse-porous diffusers at a first volume V1, wherein the second source of air can be adjusted to deliver air to the fine-porous diffusers at a second volume V2.

19. The aerator of claim 1, wherein the housing further comprises a plurality of coarse-porous diffusers and a plurality of fine-porous diffusers, and wherein the coarse-porous diffusers are disposed within the housing on a co-planar and generally horizontal axis, proximate to the water inlet section, and wherein the fine-porous diffusers are disposed forward of the coarse-porous diffusers on a co-planar, generally horizontal axis, proximate to the water outlet section, wherein the fine-porous diffusers further extend outside of the housing.

20. The aerator of claim 1, wherein the housing further comprises a plurality of coarse-porous diffusers and a plurality of fine-porous diffusers, and wherein the coarse-porous diffusers are disposed within the housing on a co-planar and generally horizontal axis, proximate to the water inlet section, and wherein the fine-porous diffusers are disposed above the coarse-porous diffusers, on a multi-planar, generally vertical axis, proximate to the water outlet section.

21. The aerator of claim 14, wherein the coarse-porous diffusers are disposed within the housing on a co-planar and generally horizontal axis, proximate to the water inlet section, and wherein the fine-porous diffusers are disposed above the coarse-porous diffusers, on a multi-planar, generally vertical axis, proximate to the water outlet section.

22. An improved aerator for the oxygenation of a water body comprising:
   a. a housing configured to be positioned in the water body, the housing further having a water inlet section and a water outlet section;
   b. a coarse-porous diffuser positioned proximate the water inlet section and a fine-porous diffuser positioned proximate the water outlet section; and,
   c. a source of air in fluid communication with the diffusers.

23. The aerator of claim 22, wherein the fine-porous diffuser extends outside the water outlet section of the housing.

24. The aerator of claim 22, wherein the fine-porous diffuser is positioned entirely outside the housing.

25. The aerator of claim 22, wherein the fine-porous diffuser is positioned such that substantially all of the bubbles it produces during operation of the aerator are formed outside the housing.

* * * * *